Patented Dec. 21, 1937

2,102,976

UNITED STATES PATENT OFFICE 2,102,976

METHOD OF MAKING REFRACTORY BRICKS

Gilbert E. Seil, Cynwyd, Pa., assignor to E. J. Lavino and Company, Philadelphia, Pa., a corporation of Delaware No Drawing. Application September 11, 1936, Serial No. 100,384

4 Claims. (Cl. 25—156)

This invention relates to refractory materials and refractory bodies, although more particularly to a refractory comprising mullite.

Heretofore mullite refractories have been made by using as starting materials a ground mullite-forming substance and mixing therewith from 20% to 50% of a plasticizer and bond such as clay, whereupon the mixture is exposed to a single finishing heat treatment. After this heat treatment, the inorganic bonding substance is still present. It resides or is interspersed among and between the mullite particles as an adulterant so that in effect it constitutes weaker links among the stronger links of mullite in the chain or assembly of refractory particles.

Accordingly, one object of this invention is to devise a refractory material comprising essentially mullite. Another object is to effect the making of refractory bricks or other refractory forms composed substantially entirely of mullite crystals essentially without the presence thereamong of inorganic bonding or plasticizing substances or of other weaker adulterants. And yet another object is to effect a refractory mix which, prior to being pressed and burned into final shape, has the component materials thereof in physical and chemical equilibrium.

These and possibly other objects can be attained by using as starting material any raw material or mixture of raw materials from which, upon heating, there is yielded mullite. Mullite has the formula $3Al_2O_3.2SiO_2$. The chemical analysis of pure mullite would be 71.8% $Al_2O_3$ and 28.2$SiO_2$ so that the percentage ratio of $Al_2O_3$ to $SiO_2$ is 2.55:1. If in the raw materials started with there is a deficiency below the theoretical requirements of the $Al_2O_3$ to $SiO_2$ ratio, it can be corrected by the addition of corundum or bauxite or clay before forming the mullite. The mixture is then heated to a temperature in excess of 3100° F. with the result that mullite is formed in a stabilized condition, that is, in chemical and physical equilibrium. Thereafter the mullite is ground, classified or sized, tempered and formed as into bricks. The bricks are subsequently dried, and burned at a sufficiently high temperature.

As raw starting materials, there may be used aluminum silicate minerals such as kyanite, sillimanite, andalusite or dumortierite. Or a mixture of minerals can be used which will yield mullite on heat treatment. Such mixtures would consist of the proper proportions of (1) corundum and silica; (2) corundum and clay; (3) bauxite and silica; and (4) bauxite and clay.

Kyanite, sillimanite and andalusite are aluminum silicates having the composition $Al_2O_3.SiO_2$. If 100% pure, they have the analysis of 36.8% $SiO_2$ and 63.2% of $Al_2O_3$. Dumortierite is a basic aluminum silicate whose formula is $4Al_2O_3.3SiO_2$, and when pure it contains 30.6% of $SiO_2$ and 69.4% of $Al_2O_3$. Corundum is essentially pure $Al_2O_3$. Bauxite is hydrous aluminum oxide ($Al_2O_3.2H_2O$). Clay, of course, is a general term covering aluminum silicates in which the ratio of alumina to silica varies considerably, and in using any given clay, the correction with either corundum or bauxite should be calculated from analytical data.

More particularly then, this invention is practiced by starting with raw material or a mixture of raw materials which, on heating, yield mullite but the material or mixture advantageously should have the $Al_2O_3$ and $SiO_2$ components thereof so balanced or proportioned either naturally or by correction, that after the heat treatment there remains essentially mullite without any weaker substance being present therewith as the result of conversion by heat. This heat treatment is carried out preferably in a rotary kiln at a temperature in excess of 3100° F.

The resulting mullite is ground as a result of one or more grinding operations, and sized or classified, whereby there can be controlled the desired particle shape, mesh ratio of sizes and surface condition. This heat-treated mullite material may be sold as such to refractory makers or users, but in any event, it should have the following treatments for making the material in refractory shapes. The sized and ground material is then tempered in a wet pan (preferably by the use of heavy mullers, but in such a way that the mesh ratio of particle size remains essentially unchanged) with water and some organic binder such as starch, goulac or the like, usually used to give sufficient strength to the green ware to permit the necessary handling to dryers and kilns and is formed into the desired shapes by the use of a power press, hydraulic press or by any of the usual methods. The shaped refractory bodies are then dried in a manner to preclude detrimental cracking. Next, the dried bodies or bricks are burned to a temperature in excess of 3000° F., preferably in a tunnel kiln, following a heat curve which insures proper burn and curing to the center of the brick. The burning temperatures may vary slightly, depending upon the type of kiln and the length of time the bricks are allowed to soak at the maximum temperature. The finished bricks comprise essentially mullite crystals and have load-bearing, spall-resisting and slag-resisting properties which make them superior to bricks made from mullite-forming materials to which clay or other plastic or bonding materials have been added, and which are finished in one heat treatment.

*Example 1.*—The starting material is an aluminum silicate mineral which on heating yields mullite. Examples of such minerals are kyanite, andalusite, sillimanite, and dumortierite. As a specific instance let us take kyanite of the following chemical analysis:—

| | Per cent |
|---|---|
| $Al_2O_3$ | 64.25 |
| $SiO_2$ | 31.06 |
| $Fe_2O_3$ | 2.29 |
| CaO | 1.02 |
| MgO | 0.18 |

The ratio of $Al_2O_3$ to $SiO_2$ in this analysis is 2.08 to 1. This material with no corrections, treated in accordance with my process, will yield a very satisfactory brick composed essentially of mullite because the excess silica also yielded by the heat treatment is present as crystobalite which is non-detrimental in the final product. However, if it is desired to correct this material to exactly the mullite analysis, this correction would be made as follows:

For each 100# of mixture one would use 87½# of kyanite and 12½# of corundum, which is essentially pure $Al_2O_3$.

| | $\#Al_2O_3$ | $\#SiO_2$ |
|---|---|---|
| 87.5# Kyanite | 56.22 | 27.18 |
| 12.5# Corundum | 12.50 | |
| | 68.72 | 27.18 |

The ratio of $Al_2O_3$ to $SiO_2$ in this mixture is 2.53 to 1. This mixture is chemically correct for the production of mullite. Of course, by changing the amounts, a slight excess of deficiency of alumina can be obtained as desired.

*Example 2—Corundum and silica.*—Since both these commodities are available in essentially pure forms, the mixture would consist of 72 parts of corundum and 28 parts of silica.

*Example 3—Corundum and clay.*—Since clay is a general term, covering a wide range of alumina-silica ratios, I shall use, for the purpose of illustration, the clay called kaolinite, $$Al_2O_3.2SiO_2.2H_2O$$

which on the ignited basis contains 46% $Al_2O_3$ and 54% $SiO_2$. In 100# of a mixture of these two materials one would use the following:—

| | $\#Al_2O_3$ | $\#SiO_2$ |
|---|---|---|
| 52.5# Clay | 24.15 | 28.35 |
| 47.5# Corundum | 47.50 | |
| | 71.65 | 28.35 |

Here again there is a starting ratio of $Al_2O_3$ to $SiO_2$ of 2.53 to 1. This mixture is chemically correct for the manufacture of mullite.

*Example 4—Bauxite and clay.*—Theoretically bauxite is a hydrous aluminum oxide containing 74% $Al_2O_3$ and 26% water. If such a bauxite were obtainable it would be essentially pure $Al_2O_3$ when ignited and would, therefore, be used for calculations exactly as I have used corundum above. A typical commercial bauxite has the following analysis:—

| | Per cent |
|---|---|
| $Al_2O_3$ | 57.00 |
| $SiO_2$ | 8.00 |
| Water | 26.00 |

On the ignited basis this bauxite contains $Al_2O_3$ 77.1%, silica 10.8%. To prepare a mixture of this bauxite with the kaolinite clay described, one would use for 100# of mixture:—

| | $\#Al_2O_3$ | $\#SiO_2$ |
|---|---|---|
| 35# Clay | 16.1 | 18.9 |
| 65# Bauxite | 50.1 | 7.1 |
| | 66.2 | 26.0 |

In this mixture the ratio of $Al_2O_3$ to $SiO_2$ is 2.54 to 1 and the mixture is chemically correct for the production of mullite.

The advantages of the use of this invention lie, first, in the close control maintainable in preparing the material for brick manufacture; second, in the fact that the prepared material is more suitable for the processing steps, especially the burning step; third, in the purity of the finished product with its superior characteristics; and fourth, in the avoidance of physical and chemical rearrangements during the burning of the shaped refractories.

More particularly, an important factor of this invention is the absence of bonding material and the fact that the needles of mullite which lie in various directions are interlocking and thus add strength to the refractory structure made thereof.

I claim:

1. The process of making a refractory material, which comprises heating to a temperature in excess of 3100° F. a mixture of at least one aluminum silicate mineral with another alumina bearing material whereby in the resulting mixture the ratio of $Al_2O_3$ to $SiO_2$ is such that after exposure to said temperature there remains a conversion stabilized product consisting essentially of mullite crystals substantially free from weaker refractory material.

2. The process of making refractory bricks, which comprises heating ground mullite-yielding material to a temperature in excess of 3100° F. for effecting the conversion thereof essentially entirely into mullite in chemical and physical equilibrium and substantially free from weaker refractory material, grinding the resulting mullite, tempering it, shaping it into bricks, drying the bricks, and burning the dried bricks in a kiln.

3. The process according to claim 2, in which the mullite-yielding material is heated in a kiln.

4. The process according to claim 2, in which the ground mullite is mixed with an organic binder to aid in its shaping into bricks.

GILBERT E. SEIL.